(12) United States Patent
Riddiford

(10) Patent No.: US 8,950,889 B2
(45) Date of Patent: Feb. 10, 2015

(54) GRAVITY-POWERED ELECTRICAL ENERGY GENERATORS

(75) Inventor: Martin Philip Riddiford, London (GB)

(73) Assignee: Deciwatt Limited, London (GB)

( * ) Notice: Subject to any disclaimer, the term of this patent is extended or adjusted under 35 U.S.C. 154(b) by 148 days.

(21) Appl. No.: 13/502,036

(22) PCT Filed: Oct. 14, 2010

(86) PCT No.: PCT/GB2010/051734
§ 371 (c)(1),
(2), (4) Date: May 9, 2012

(87) PCT Pub. No.: WO2011/045606
PCT Pub. Date: Apr. 21, 2011

(65) Prior Publication Data
US 2012/0212948 A1    Aug. 23, 2012

(30) Foreign Application Priority Data
Oct. 14, 2009 (GB) .................... 0918002.7

(51) Int. Cl.
*F21L 13/06* (2006.01)
*F21V 9/16* (2006.01)
(Continued)

(52) U.S. Cl.
CPC *F03G 3/00* (2013.01); *H02K 7/116* (2013.01); *F21L 13/06* (2013.01)
USPC ............... 362/193; 362/84; 362/192; 185/27; 185/32

(58) Field of Classification Search
CPC ........ F21L 13/06; H02K 7/18; H02K 7/1807; H02K 7/1846; H02K 7/1853; H02K 53/00; H02K 7/116; F03G 3/00; F03G 3/02; F03G 3/04; F03G 3/06; F03B 17/04; H02N 2/18; H02N 2/123; H02N 11/002; H02N 11/006

USPC ............... 310/83, 339; 185/4, 27, 32–35, 39, 185/40 R; 362/192, 193, 391, 84; 475/269, 475/331, 338
See application file for complete search history.

(56) References Cited

U.S. PATENT DOCUMENTS 1,513,646 A * 10/1924 Smith ............................ 60/507
2,422,753 A *  6/1947 Sowerwine ................... 185/33
(Continued)

FOREIGN PATENT DOCUMENTS

DE    102005051929 A1    5/2007
DE    102007057323 A1    6/2009
(Continued)

OTHER PUBLICATIONS

Machine translation of DE102005051929A.*
(Continued)

*Primary Examiner* — Alan Cariaso
(74) *Attorney, Agent, or Firm* — Blank Rome LLP

(57) ABSTRACT

Gravity powered electrical energy generators, particularly for producing lighting is disclosed. The apparatus has a support frame (1, 30) in which a series of gears and a gear-driven generator (20) are mounted. The power to drive the most upstream gear (2) is provided by a weight suspended from a point to one side of the axis of rotation of gear (2). The drive gear of the furthest downstream gear has no teeth so that the final contact between the drive gear and the shaft of the generator (20) is frictional. The gear ratio of the final downstream gear is at least 25. When used for lighting, the apparatus may include one or more high brightness LEDs (40) mounted on the housing (30). By suitable choice of gear ratios, the device may produce thirty minutes of illumination while allowing a 10 kilogram weight to fall through a distance of 1.8 meters.

16 Claims, 2 Drawing Sheets

(51) Int. Cl.
*F03G 3/00* (2006.01)
*H02K 7/116* (2006.01)

(56) References Cited

U.S. PATENT DOCUMENTS

| | | | | |
|---|---|---|---|---|
| 2,461,258 | A | * | 2/1949 | Brooks ............................ 322/28 |
| 2,490,309 | A | * | 12/1949 | Lehman ........................ 362/192 |
| 5,893,629 | A | * | 4/1999 | Gubernick .................... 362/186 |
| 7,361,074 | B1 | * | 4/2008 | Periman et al. ............... 446/242 |
| 8,006,819 | B2 | * | 8/2011 | Dell et al. ........................ 192/42 |
| 2006/0137390 | A1 | | 6/2006 | Iverson |

FOREIGN PATENT DOCUMENTS

| | | |
|---|---|---|
| FR | 2929659 A1 | 10/2009 |
| WO | 2009004645 A2 | 1/2009 |
| WO | 2009120058 A1 | 10/2009 |

OTHER PUBLICATIONS

Machine translation of DE1020070057323A.*
Machine translation DE102005051929, Peter, Klaus, May 3, 2007, pp. 1-5.*
Machine translation DE102007057323, Pesch, Jurgen, Jun. 4 2006, pp. 1-5.*

* cited by examiner

GRAVITY-POWERED ELECTRICAL ENERGY GENERATORS

CROSS-REFERENCE TO RELATED APPLICATIONS

The present application claims the benefit of International Patent Application No. PCT/GB2010/051734, filed Oct. 14, 2010, which in turn claims priority to Great Britain Patent Application No. GB0918002.7, filed Oct. 14, 2009, the entire disclosures of which are incorporated by reference herein.

BACKGROUND OF THE INVENTION

1. Field of the Invention

This invention relates to gravity-powered electrical energy generators and, in particular, to apparatus adapted for providing light without the necessity of using electrical storage devices.

2. Description of the Related Art

Since the dawn of civilisation, people have desired light during the hours of darkness. For the majority of prehistoric and historic times, this has been provided by combustion of an appropriate fuel, originally a fire using whatever combustible material was to hand and later using a combustible hydrocarbon fuel, for example wax in the case of candles and tapers or, more recently, various oils. The modern development of the oil and gas industry has led to the development of lamps fuelled by kerosene or paraffin, or by a cylinder of compressed gas, usually, though not exclusively, butane. Such lighting consumes fossil fuels and is accordingly environmentally damaging and ultimately unsustainable.

The development of the electric light bulb during the 19th century enabled a vast increase in the amount of night time lighting to be achieved, albeit at the substantial capital cost of installing the necessary grid infrastructure to distribute electricity, as well as the investment needed in electrical generation plant, whether by burning fossil fuel or latterly by hydroelectric power. While electrical lighting became ubiquitous in the industrially developed countries, it has never been a solution to the problem of providing light at night in rural areas and in developing countries.

During the 20th century, major advances were made in terms of the efficiency of light generation from electrical devices, as well as in the development of electrical storage systems, albeit that the latter generally involve the construction of electrical storage cells using expensive materials which are often toxic and which in turn gives rise to disposal problems, particularly in the case of non-rechargeable storage devices.

The 20th century also saw the development of devices and materials able to convert sunlight direct to electricity, so enabling a 'solar panel' to collect light and produce electricity during the day and feed it to a storage device, whence the stored electrical power could be tapped during the night to operate a light. Again, the investment required to manufacture solar panels is substantial, and they are prone to damage unless substantial steps are taken to preserve them. They also have a limited service life and, despite recent increases in efficiency, simply do not produce that much power.

Attempts have been made in the past to provide apparatus for converting the power of gravity acting on a weight to electrical power. U.S. Pat. No. 5,905,312 describes a gravity-powered electrical generation system which is powered by water which is fed from a tank above the apparatus into a series of small tanks which are mounted on a vertical loop of material. The weight of water in the tanks causes the loop to turn and its slow rotation is converted via a system of gearing into fast rotation of the power input shaft of an electrical generator. Such a device is complex to build and maintain and unsuited for generating small quantities of electricity to produce light in rural areas.

A columnar light powered by gravity was announced in February 2008. It was said to be the idea of Clay Moulton and disclosed generating electricity by the slow fall of a mass which spins a rotor. The energy thereby released was said to power ten high output LEDs which emitted light into an acrylic lens to create a diffuse light. The device was described as requiring the turning over of an hourglass-like mechanism to move a movable weight from a lower position to a higher position, whereafter it would glide gently downwards while lighting the lamps.

SUMMARY OF THE INVENTION

We have now found that, by careful design, it is possible to produce lighting apparatus based on a gravity-powered electrical energy generator which may be of simple construction and which is well-adapted for mass production so as to produce lighting apparatus which is easily deployable in the field and which provides useful quantities of lighting while being very easy to maintain and resistant to adverse conditions.

According to the present invention, there is provided a gravity-driven electrical energy generator apparatus comprising a support frame, at least two high step-up ratio gears mounted in series in the support frame, wherein the power input to the most upstream gear is provided by a weight suspended from a point to one side of the axis of rotation of the gear, and wherein the power output from the most downstream gear is the shaft of a generator, the output of the generator being sufficient to power at least one high brightness LED. The apparatus is characterised in that the gear ratio of the final high ratio gear is at least 25 and the contact between the drive gear and the generator shaft is frictional.

Preferably there are two or three step-up gears and the gear ratio of each is greater than 25, preferably greater than 30. The most upstream gear is preferably of sun-and-planet gear construction.

Preferably the most upstream gear has a hub around which is looped a suspension cord for a weight. A free-wheel mechanism may be provided between the hub and the most upstream drive gear, allowing rewinding of the cord around the hub while raising the weight. A preferred mechanism consists of two spring pawls mounted inside the hub and designed to engage on a circular ratchet on the most upstream gear. Alternatively the cord may be looped two to four times around the hub and a counterweight provided (for example one twentieth of the weight of the drive weight) on the cord so as to hold the cord taut around the hub and enable the hub to be driven by the drive weight. This mechanical arrangement is analogous to that of a capstan used to drive a rope on a ship or quayside, though, in that particular case, the capstan is driven and the rope intermittently engaged e.g. to weigh anchor or to assist in mooring the ship. In such apparatus according to the present invention, the most upstream gear is driven save when the weight is lifted briefly to reset the apparatus for a fresh bout of electrical energy generation.

If the most upstream gear is provided with a self rewind mechanism, the user only has to lift the weight to reset the apparatus for a further bout of electrical energy generation. For example, the cord may be fixed at one end to the most upstream gear, looped round it several times, and then have means at its free end for attaching the weight. By building in a rewind mechanism, for example consisting of a pawl and ratchet and a coil spring, for example analogous to the constant force spring used in a windup tape measure, the most upstream gear may be rewound against the ratchet when the main weight is lifted. In place of the spring, the rewind may be generated by a small counterweight with the centre of the cord between the hook for the main drive weight and the counterweight being fixed to the gear. In yet a further embodiment, the suspension cord has a stop piece fixed on it which, as the weight approaches its lowermost position, approaches the side of a housing contacting the gearing. When the stop contacts the housing, the gears can no longer turn. By pulling the stop down, the mechanism is reset for a further bout of electrical energy generation.

To assist rewinding the apparatus in the dark, when it has been used for generating light, the apparatus may carry a patch of luminous material, which will be charged when the light is working and which will continue, for a short period of time, to give out enough light when the weight has dropped to the ground or floor, or the stop has reached the housing, to enable the user to locate the apparatus easily and lift the weight up (or pull the stop down).

The support frame is, in use, hung from a suitable member, such as a roof beam or a tree branch a satisfactory distance above the floor or ground to provide a reasonable time period during which a weight attached to the cord will slowly descend.

The generator used in apparatus according to the present invention may be a purpose-built and designed generator, but we have found that commercially widely available small low voltage electric motors can easily be used as generators, giving good results when used using standard high brightness LEDs. The voltage rating of the LED should, of course, be matched to the voltage output of the generator.

Preferably the diameter of the drive shaft of the generator is as small as possible to give the greatest final gear ratio possible. It is preferable to mount, adjacent the shaft and opposed to the gear which drives it, one or two 'pinch' wheel(s) which assist in maintaining the frictional contact, to reduce any tendency to slipping, while also reducing the lateral force on the input shaft of the generator. The drive shaft to the generator may be a simple constant diameter shaft, but it is also possible to make the shaft tapered, so that by moving the generator in the direction of the axis of the drive shaft gear ratio between the drive shaft and the disc driving it frictionally changes. Such movement of the generator may be achieved by having a 'tuning' knob e.g. mounted on the outside of a housing of the apparatus so that the user can adjust the knob till the light output is brightest for a particular weight. It may also be possible to effect such an adjustment automatically from a spring balance mechanism associated with the hanging hook, so that the amount of weight self-adjusts the gear ratio.

The exterior periphery of the drive gear of the final step-up gear, i.e. of the smooth gear wheel which engages frictionally with the exterior of the drive shaft of the generator, is preferably rounded or domed when seen in radial section.

The apparatus according to the present invention, when used for illumination, may have a single LED connected thereto, or a plurality of LEDs may be connected in parallel to provide extended lighting areas as required. One or more of the LEDs may be mounted on a casing forming part of the apparatus to provide lighting in the area where the device is located. Alternatively or additionally, the apparatus may have a pair of terminals connected to a length of electrical flex, at the other end of which is mounted an LED. This is of particular value, for example, if the user of the apparatus needs a light source located nearer the ground or floor than the apparatus itself, for example to use for reading a book.

The detailed design and construction of the apparatus may vary, but is preferably kept simple and straightforward to ensure high reliability in practice. In particular, the apparatus may be configured as an energy-generating module with means for hanging the apparatus e.g. on a beam or tree branch and with a cord having a hook on to which a weight may be attached, for example in the form of a bag filled with water, or a rock.

If desired, the apparatus may include a latch mechanism which prevents the gears from turning until released. This is of particular value if it is desired to produce energy continuously for a longer period of time than a single passage of the weight from the location of the apparatus to the floor or ground will allow. By using a set of adjacently mounted such apparatus, and by triggering the latch to be released on a second such apparatus when the weight of the first approaches the ground, the second such apparatus may be brought into use as the first ceases to operate (until, of course, it is rewound by lifting the weight).

We have found that using a simple design, it is possible to produce sufficient energy to provide 30 minutes of illumination from a weight of 10 kilograms falling through a distance of 1.8 meters. This distance was chosen because it corresponds to raising a weight from the floor to just above head level, i.e. to just below a ceiling beam from which the device may be suspended.

While, as noted above, the apparatus of the present invention is particularly adapted for generating power to run one or a few high brightness LEDs for an extended period of time, e.g. up to 30 or more minutes, it may also include means for reducing the step-up gear ratio of the final gear substantially, for example, from at least 25 to e.g. 2 to 5. While such reduction materially reduces the period of time taken for the weight to fall through a given distance, it substantially increases the electrical power available for that period which enables the apparatus to be used to recharge electrical devices which are driven by stored charge, for example mobile telephone handsets, rechargeable torches or flashlights, and UV water purification pens. The change in the final gear ratio may be achieved by any suitable practical mechanism, for example mounting a toothed ring on the final drive gear of the high-ratio step-up gear, mounting a cog on the generator input shaft and fixed rotationally thereto, and providing the cog for the temporary engagement of ring and cog to substitute the not-so-high step-up gear ratio of the final step-up gear is 2 to 5. We have found that using a gear ratio of 2.5 in apparatus otherwise as described above, we can charge a mobile phone handset with two 1.8 m drops of the 10 kg weight taking just over six minutes, sufficiently to provide three minutes of talk time or three hours in standby mode. Likewise, two 1.8 m drops can provide sufficient power to sterilise 290 ml of water using a low power UV sterilisation unit.

BRIEF DESCRIPTION OF THE DRAWINGS

The invention is illustrated by way of example with reference to the accompanying drawings in which.

DETAILED DESCRIPTION OF THE PREFERRED EMBODIMENTS

Figure 1:
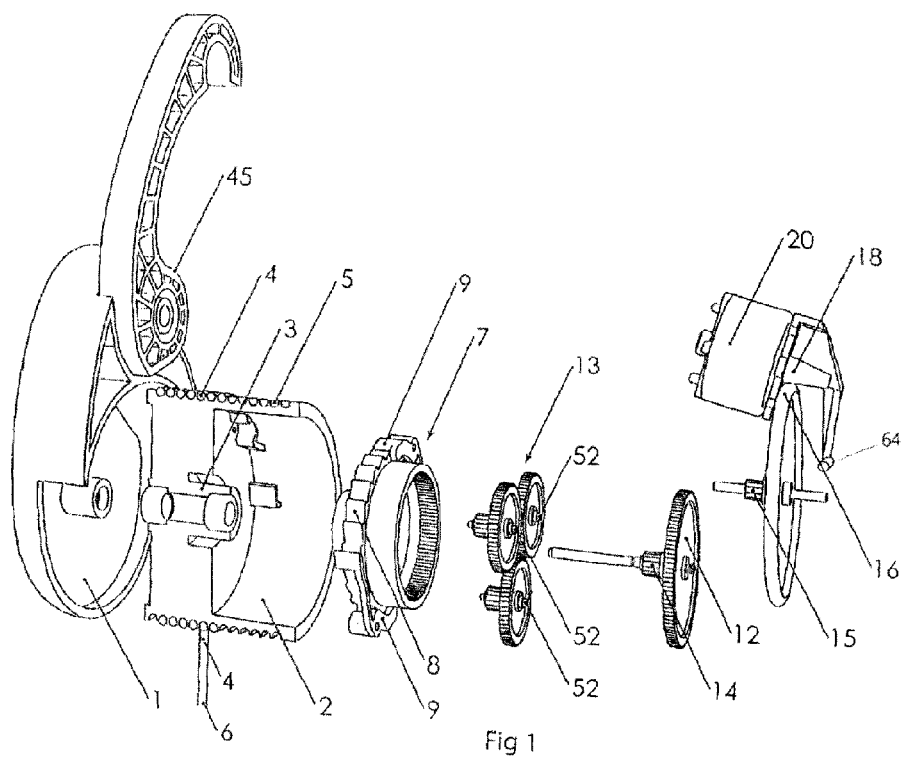
FIG. 1 shows a simple exploded view of apparatus according to the invention, with certain components omitted for clarity and certain others shown sectioned.
Figure 2:
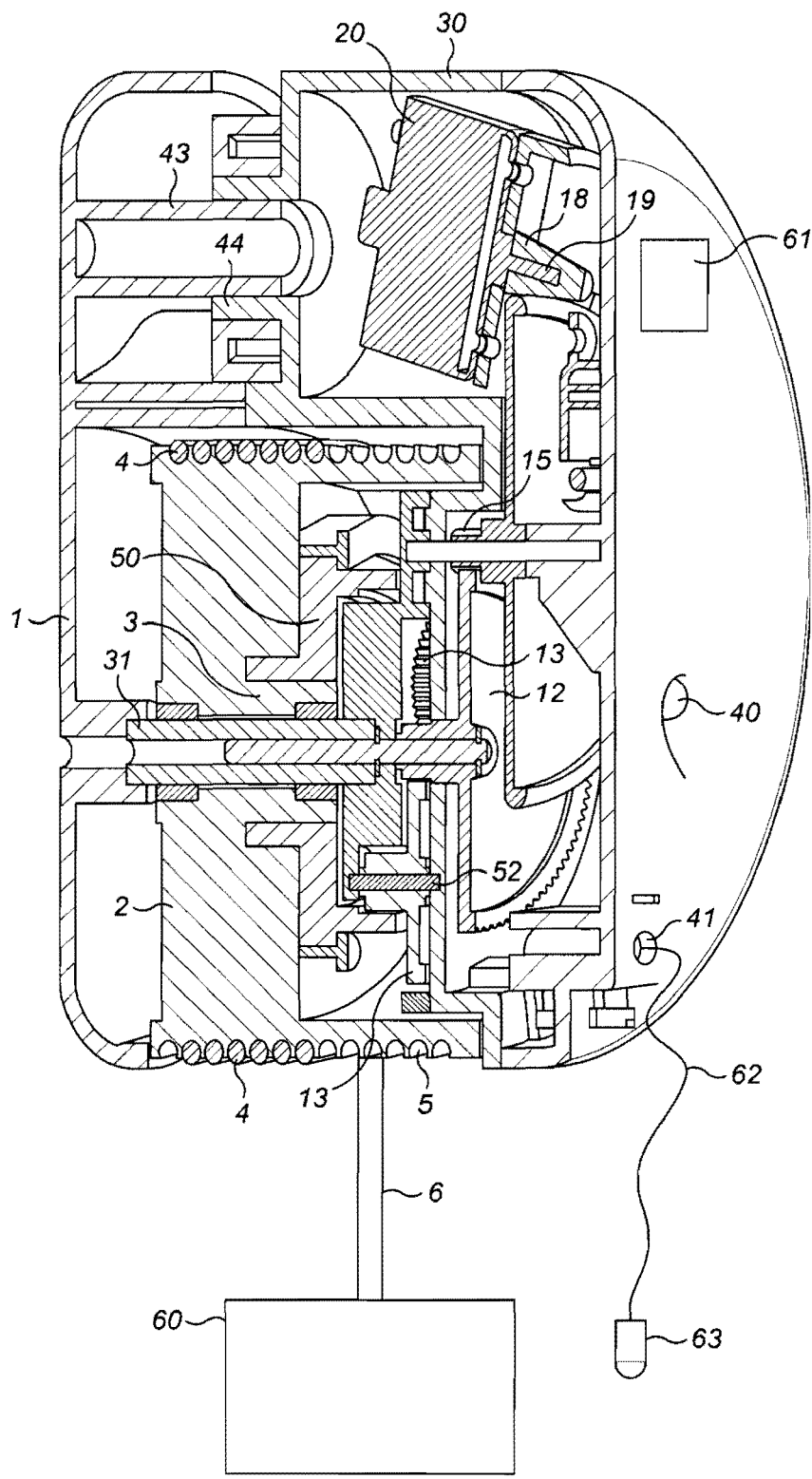
FIG. 2 is a vertical section through the assembled apparatus according to the present invention shown in FIG. 1.

Referring to the drawings, the apparatus consists of a housing formed of two halves 1, 30 in which the main component of the apparatus are located. As shown in FIG. 1, the housing half 1 is shown on the left. A stub axle 31 (shown in FIG. 2) is mounted on the housing half 1 on which a drive drum 2 is rotatably mounted. The hub of drum 2 which surrounds axle 31 is denoted 3. The exterior of drive drum 2 has a spiral groove 5 moulded into it around which is wound several turns of a cord 4, a depending portion 6 of which carries in use a heavy weight, for example 10 kilograms.

The exterior of hub 3 carries an annular member 7 with an external ratchet ring 8 which cooperates with two spring pawls 9 mounted within drum 2. This allows the drum to be rewound when the weight 60 has dropped to the floor.

Attached to end of stub axle 31 remote from the housing half 1 is a mount plate 50. Mount plate 50 is so attached to stub axle 31 so that it can not move relative to the stub axle 31 or housing half 1. Mounted on mount plate 50 via axles 52 are three planet gears 13 forming part of a compound sun and planet gear arrangement with a sun wheel 12. Sun wheel 12 has a toothed hub 14 meshing with the toothed periphery of planet gears 13. The outer periphery of sun wheel 12 is toothed and meshes with a toothed hub 15 of an intermediate gear wheel 16 which has a smooth circular periphery.

The smooth exterior of gear wheel 16 is in contact with a conical driven member 18 mounted on a shaft 19 of a small electric motor 20 and which is biased against the rim of disc 16.

Shaft 19 is the output shaft of motor 20 when the motor is used as a motor.

In this apparatus, shaft 19 is driven so the motor acts as a generator. Its normal input terminals are accordingly output terminals for a generator and these output terminals are connected via suitable wiring to a high brightness LED 40 mounted in housing portion 30, and to an output socket 41 to which further LEDs 63 may be connected by an electrical lead 62.

Moulded into the top of housing halves 1 and 30 are an interengaging pillar 43 and socket 44 which form a shaft on which is mounted a swivellable hook 45 enabling the device to be hung up when needed for use.

The device may be supplied fully assembled and sealed simply requiring hanging from a suitable structure and the addition of a weight 60 to cord 6 to operate it. For example, the user may first hang the device on a suitable roof beam or the like and then fix a weight 60 to cord 6. The weight 60 causes drum 2 to turn, very slowly, with pawl 9 causing member 7 to turn with it. That rotation then causes the step-up gears to rotate and accordingly to drive shaft 19 and the motor/generator 20 then produces electricity causing the LED 40 to light.

When the weight 60 reaches the ground, the device may be reset by rotating drum 2 anti-clockwise as shown in the drawing, with pawl 9 passing over the teeth of ratchet ring 8. Anti-clockwise rotation can occur by means of a spring in drum 2 (not shown) or by pulling on a cord (not shown) wound on to groove 5 as the weight drops.

What is claimed is:

1. A gravity-driven electrical energy-generating apparatus comprising:
    a support frame; and
    at least two high step-up ratio gears mounted in series in the support frame,
    wherein a most upstream gear is configured to receive power from a weight, suspended from a point to one side of an axis of rotation of the most upstream gear;
    wherein a power output from a most downstream gear is provided to a drive shaft of a generator, and
    wherein the most downstream gear step-up ratio is achieved through a frictional relationship between a toothless wheel having a smooth circumferential surface and a smooth circumferential surface of a driven member mounted on the generator drive shaft.

2. The apparatus according to claim 1, wherein the apparatus comprises two or three step-up gears of gear ratio greater than 25.

3. The apparatus according to claim 1, wherein the most upstream gear is of sun-and-planet gear construction.

4. The apparatus according to claim 1, wherein the most upstream gear is rotatably mounted to a drum around which is looped a suspension cord for a weight.

5. The apparatus according to claim 4 further comprising a free-wheel mechanism acting on the drum.

6. The apparatus according to claim 5, wherein the free-wheel mechanism comprises two spring pawls configured to engage on a circular ratchet.

7. The apparatus according to claim 1 further comprising a patch of rechargeable luminous material on an exterior of the support frame,
    wherein the luminous material is configured to charge when exposed to light, and wherein, after ceasing to be exposed to light, the luminous material is configured to emit enough light to facilitate location of the apparatus in the dark.

8. The apparatus according to claim 1, wherein the generator is a small low voltage electric motor.

9. The apparatus according to claim 1 further comprising at least one pinch wheel mounted adjacent to the generator drive shaft, and opposed to the most downstream gear,
    wherein each pinch wheel is configured to assist in maintaining the frictional contact between the most downstream gear and the generator drive shaft to reduce a lateral force on the generator drive shaft.

10. The apparatus according to claim 1, wherein the generator drive shaft is tapered and moveable relative to the wheel of the most downstream gear to change the step-up ratio.

11. The apparatus according to claim 1, wherein an exterior periphery of the most downstream gear is rounded or domed when seen in radial section.

12. A lighting apparatus comprising:
    an electrical energy-generating apparatus according to claim 1; and
    at least one high brightness LED converted to the output of the generator.

13. The lighting apparatus according to claim 12, wherein the lighting apparatus includes one or more LEDs mounted on a casing of the electrical energy-generating apparatus, and wherein the one or more LEDs are configured to provide lighting in an area where the electrical energy-generating apparatus is located.

14. The lighting apparatus according to claim 12 further comprising:
    an output socket on the electrical energy-generating apparatus; and
    a length of electrical flex, one end of which is connected to the socket, and the other end of which carries one or more LEDs connected to electrical conductors in the flex.

15. A gravity-driven electrical energy-generating apparatus comprising:
    a support frame; and
    at least two high step-up ratio gears mounted in series in the support frame, wherein a most upstream gear is configured to receive power from a weight, suspended from a point to one side of an axis of rotation of the most upstream gear;

wherein a power output from a most downstream gear is provided to a drive shaft of a generator, and further comprising a rewind mechanism, including a ratchet, which is configured to enable a user to perform a rewind procedure by manually lifting the weight.

16. The apparatus of claim 15, further comprising at least one high brightness LED connected to an output of the generator.

* * * * *